Sept. 27, 1949.  E. B. GODMAN  2,482,847
BLOWER WHEEL
Filed May 7, 1946  2 Sheets-Sheet 2
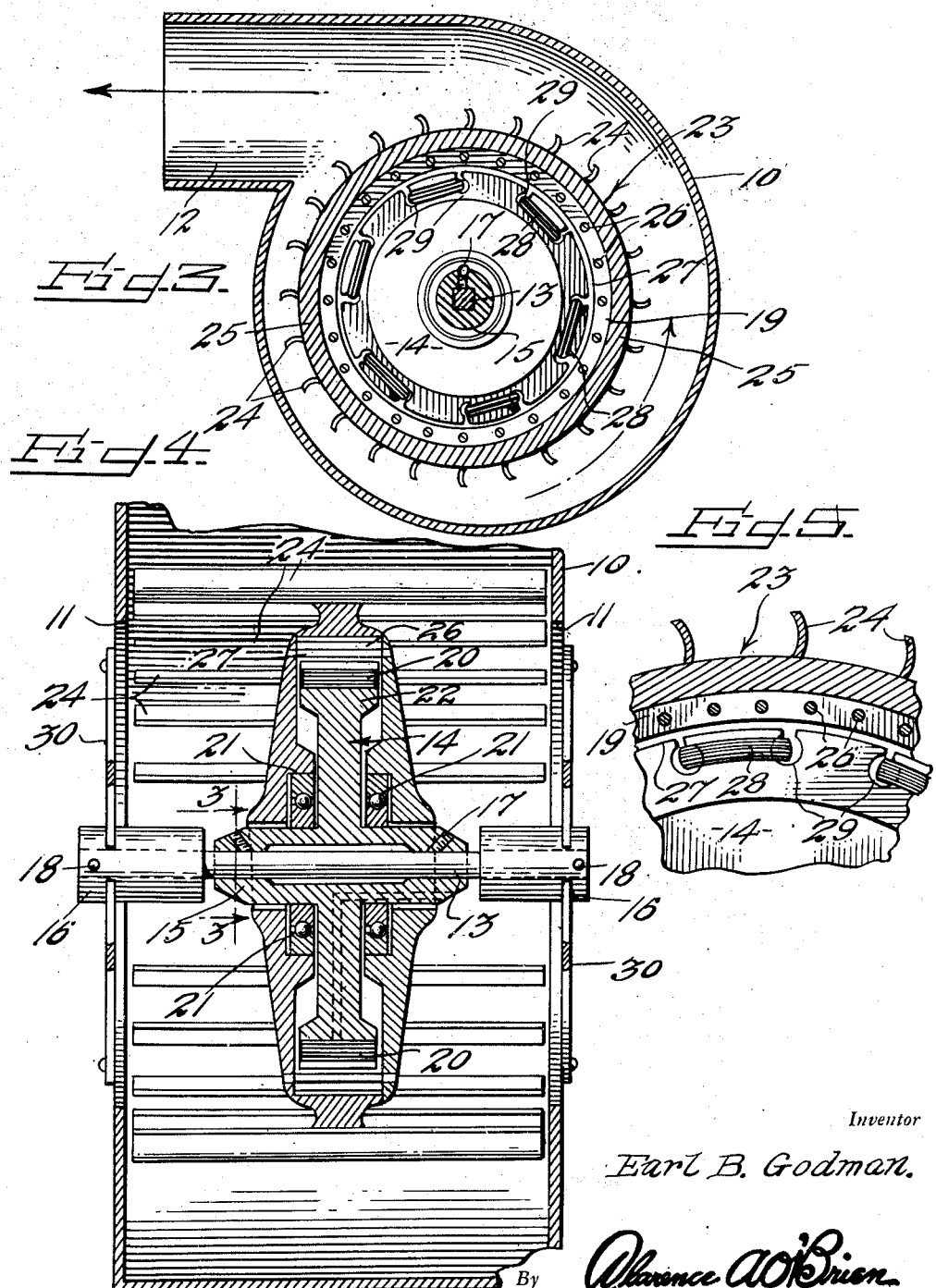
Inventor
Earl B. Godman.
By Clarence A.O'Brien
and Harvey B. Jacobson
Attorneys Patented Sept. 27, 1949

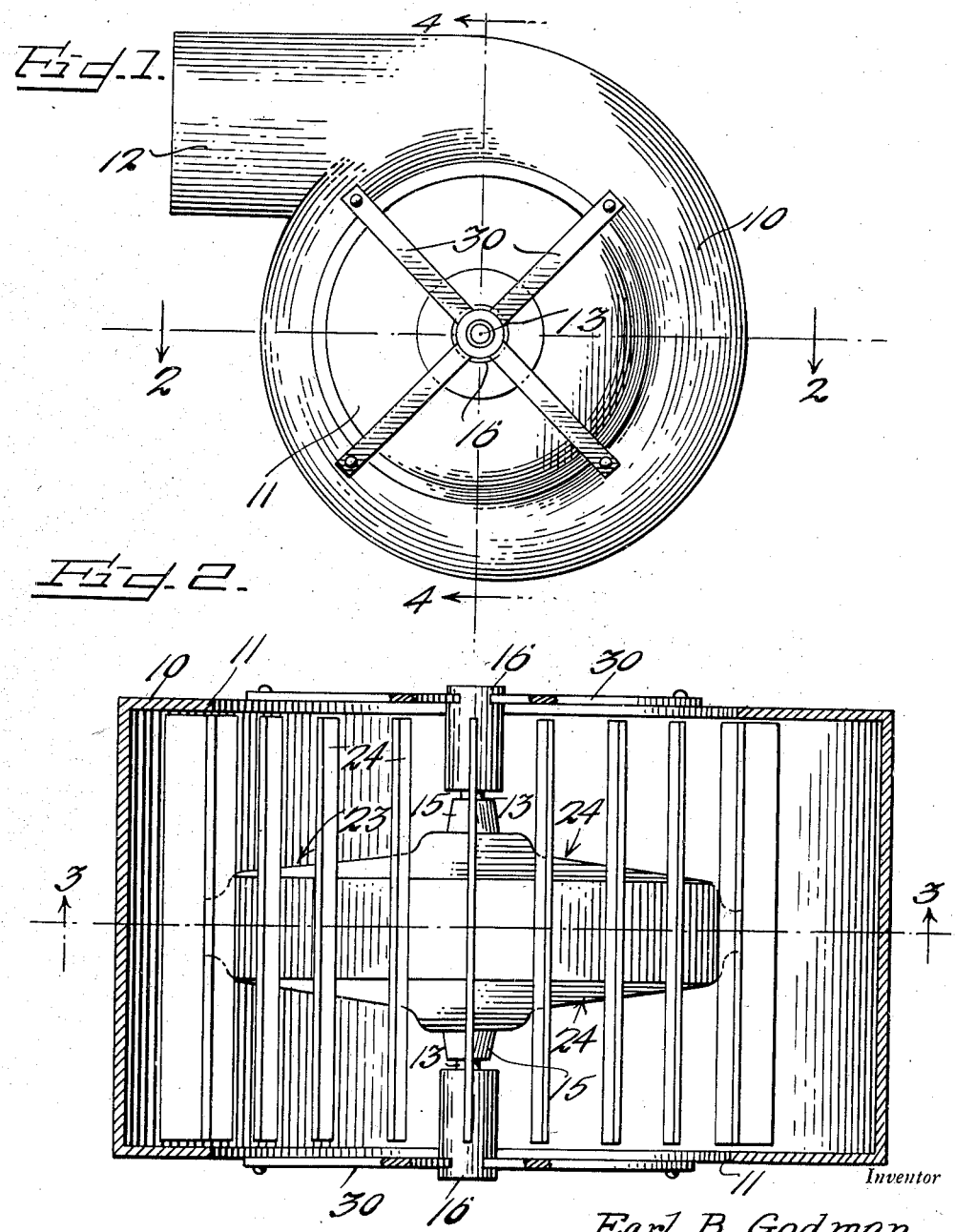

2,482,847

UNITED STATES PATENT OFFICE 2,482,847

BLOWER WHEEL

Earl B. Godman, Phoenix, Ariz.

Application May 7, 1946, Serial No. 667,839

3 Claims. (Cl. 230—128)

This invention relates to blowers, such as used in connection with ventilating fans or the like, and the object thereof is to provide an improved and novel blower for various purposes, having an internally driven blower wheel or fan, which eliminates the necessity for shafting and an external motor which is exposed to all sorts of inclement weather as used in the common type of blower construction.

Another object of the invention is to provide a novel and simple blower wheel or fan with its motor drive located inside the blower wheel, and adapted for various purposes, such as evaporative coolers, furnaces or other circulatory or ventilating systems, in moving air with an electrical drive motor built inside of the blower wheel or vanes thereof, said motor being especially of the variable speed type and having means for controlling such speeds.

Another object of the invention is to provide a blower of the class described driven by an electric motor around which the blower vanes are provided or in which the motor is provided or built, and in which the motor forms the support for the blower wheel or vanes thereof, thereby eliminating special brackets for mounting the motor and eliminating gearings, pulleys or belts for driving the blower from the motor and cause trouble.

Other objects and advantages reside in the details of construction and operation as more fully hereinafter described and claimed, reference being had to the accompanying drawings forming part hereof, wherein like numerals refer to like parts throughout, and in which:

Figure 1 is a side elevation of a blower constructed in accordance with the invention.

Figure 2 is a sectional view taken on the line 2—2 of Figure 1, with the parts enlarged.

Figure 3 is a sectional view taken on the line 3—3 of Figure 2, with the parts in the same proportions or size as shown in Figure 1.

Figure 4 is an enlarged sectional view taken on the line 4—4 of Figure 1, and

Figure 5 is an enlarged detail sectional view of the blower.

Referring to the drawings in detail, in which like reference characters designate corresponding parts throughout the several views, the blower is shown as comprising a blower housing 10 of the customary type, having an inlet 11 at each side and an outlet pipe or discharge nozzle 12, although it is to be understood that the blower may be of any suitable type, including the housing, and that the present illustration is purely for purposes of illustration and example. Axially of the open sides of the housing 10, is a horizontal support 13, which may be of any suitable cross section and suitably supported and fixed to a stator 14 which may be provided with an attaching sleeve or hub 15, shown relatively long, to give a firm support, and may be secured or fixed to the support rod or shaft 13 stationarily mounted as indicated by the sleeves 16 at the ends thereof, in any suitable frame or mounting. The sleeve or hub 15 may be keyed or otherwise removably attached to the support rod or shaft 13 as by means of set screws 17, and the support sleeves or bearings 16 fixed to the shaft as indicated by the pins or set screws 18. The motor is preferably an electric motor operable by any suitable source of current, preferably pulsating or alternating current, although the same may be direct current and is of the multi-polar or polyphase type, so as to be driven at variable speeds and suitably controlled by switches, as is common in the art, according to the standard speeds for blowers, or as required by the particular circumstances for moving air, for ventilating, evaporative coolers, or furnace purposes, or otherwise. The rotor of the motor is indicated at 19, the same having no windings, and the windings 20 being on the stator 14. The rotor 19 is free to rotate in the direction indicated by the arrows and is supported by means of suitable bearings 21 arranged on the bearing or support sleeve 15. The bearings 21 may be of any suitable type of anti-friction bearing shown to take up radial as well as lateral thrust desired, and spaced apart on each side of the stator 14 so as to constitute means for rotatably supporting the rotor on the stationary support 13 and sleeve 15 which is fastened to the support 13 by the set screws 17 as described. By having the motor of the proper multi-polar or poly-phase type, with the correct number of poles, it will be caused to rotate the blower wheel at two or more definite speeds as required, the speeds being selected by proper switches in proportion to the size of the blower wheel and vanes thereof and the capacity of the blower, as in connection with blower wheels of like size, in the conventional design.

Obviously, the support axle, rod or shaft 13 may be of any suitable size or shape, either round, square or otherwise with the stator provided with a correspondingly shaped axial hole to fit same or to conform to the size and shape of the support and to be clamped or locked to the support by set screws in the manner stated as well as to carry the anti-friction bearings on which the rotor is designed to rotate as described. It may also be mentioned that the stator of the electric motor is preferably of the A.-C. single phase type, split phase type, although in the proper instance, it may be a synchronous electro-magnetic motor, shade pole type, copsitor, three phase or other motor of the kind with winding stationary but on the round inner part, the stator having the windings 20 as above described, one of the windings of the stator being of the type as in the customary A.-C. motor except that the windings are to be on the round inner part 22 of the motor which in this case is the stationary part or stator as described. The blower wheel is indicated at 23 and comprises a plurality of radial and preferably curved vanes 24 all curved in the same direction and operating within the housing 10 in a direction indicated by the arrows in Figure 3 of the drawings. The windings 20 are fastened to the rigid support or shaft 13 through the medium of the sleeve or hub 15 and does not revolve. The squirrel cage part 25 with bars 26 rotates around the stationary stator 14 containing the windings, therefore rotating around the stator freely while supported on the bearings 21 as described. Obviously, the squirrel cage part 25 may be composed of suitably joined sections to permit assembly of the stator 14 therein. However, while the rotor rotates around the stator, it does not quite touch the same, there being a small space between as shown at 27 annularly around the stator and between the stator and the rotor, as more particularly shown in the drawings.

The stator contains the windings 20 spaced around the same concentrically in a circle, and contains a number of coils 28 mounted in key-shaped recesses or grooves 29 running transversely thereof at the periphery, the coils being mounted in such a manner as to induce currents in the bars 26 which are electric conductors and are spaced slightly apart and parallel to each other and electrically connected at each end to all the other bars in any suitable way. The electric currents of suitable frequency flowing through the coils 28 in the stator, induce currents in the bars 26 causing a flow of current in the circuits formed of the bars and their common connections at the ends. Thus the resulting magnetic field causes the rotor 25 to rotate or revolve around the central support and the concentric bearings 21, thereby taking or rotating with it the blower wheel 23 and its vanes 24 fast to the rotor as described.

Of course, it is to be understood that the bars 26 in the rotor 25, being all connected to form a squirrel cage of electric conductors, by which means the electric currents flowing through the windings 20 to rotate as described. Thus, by having the rotor rigidly connected or fixed to the blower wheel to support and drive the same, with the rotor properly supported at the required distance from and allowed to rotate around the shaft or support 13, by means of the bearings 21, directly between the stator and the rotor, and not directly between the rotor and the support, and on each side of the stator, the device will rotate evenly and with the least amount of current consumption and being driven directly, eliminate all gearings, gears, belts, or other complicated and expensive drive mechanism as in the conventional blower, thereby rendering the device economical to produce and eliminating all trouble caused by such known drive connections, as well as eliminating belts, pulleys and the like and rendering the device more compact, in addition to covering the motor instead of exposing the same to all sorts of weather conditions. The number of coils to be used in the construction of the blower, are such as to cause rotation of the rotor at the proper speed, depending upon the size of the blower wheel and the winding is to be so constructed as to allow two or more speeds properly controlled as in the usual manner, as described. Such form of speed control devices or regulators are common in the art. It should also be noted that the device is of relatively oppositely tapered formation in cross section, with the vanes extending parallel to the axis and projecting upon opposite sides of the rotor and stator centrally positioned between the ends thereof radially and permitting the use of a central horizontal stationary axis or shaft forming the support for the stator, as well as the rotor revolving thereon with interposed anti-friction bearings as described. The bearings are such that there is very little likelihood of end thrust, although this may be taken care of in any desirable way, and is especially avoided by providing recesses in the opposite sides and inner surfaces of the rotor housing, or side plates of the blower 24, between which and the stator on opposite sides thereof, the bearings are interposed to give support to the rotor and blower. Also, since the support axle or shaft 13 is held against end thrust, and likewise the hub or sleeve 15 thereon, it will be seen that the device may be constructed in a very simple and readily assembled, economical way capable of expeditious mass production.

Attention is also directed to the fact that the housing 10 may be supported in any suitable manner, as by means of spiders or a frame 30 mounted on the horizontal supports at each side of the rotor and support sleeve or hub 21 and bearing upon the horizontal support axle or shaft 13, with the sides of the housing constituting inlet openings as described.

While in the foregoing there has been shown and described the preferred embodiment of this invention it is to be understood that minor changes in the details of construction, combination and arrangement of the parts may be resorted to without departing from the spirit and scope of the invention as claimed.

What I claim is:

1. A blower of the class described comprising a stationary horizontal support, a housing supported thereover, said housing having an inlet and an outlet, a stator mounted intermediately on the stationary support and fixed thereto against rotation to extend radially therefrom, bearings on opposite sides of the stator, a rotor mounted on said bearings and projecting radially to enclose the stator upon opposite sides and at the periphery, means for inducing rotation of the rotor around the stator, and radially extending peripheral blades on the rotor within the housing.

2. A blower comprising a horizontal stationary support, a housing having side openings forming air inlets and an outlet at the top, means at said openings in the sides of the housing to support the housing on the stationary support, a stator having a hub fixed to the stationary support between the sides of the housing, bearings on said hub at opposite sides of the stator, a rotor inclosing the stator and supported on said bearings, and blades on the outer portion of the rotor and extending between the sides of the housing.

3. The combination of claim 1, wherein windings are carried by the stator alone.

EARL B. GODMAN.

REFERENCES CITED

The following references are of record in the file of this patent:

UNITED STATES PATENTS

| Number | Name | Date |
|---|---|---|
| 550,042 | Diehl | Nov. 19, 1895 |
| 623,801 | Melyer | Apr. 25, 1899 |
| 1,270,420 | Kingsbury | June 25, 1918 |
| 1,752,830 | Bliss | Apr. 1, 1930 |
| 1,835,811 | Pugsley | Dec. 8, 1931 |
| 1,861,608 | Persons | June 7, 1932 |